Dec. 17, 1963  J. PERROTTO  3,114,440
AUXILIARY SAFETY BRAKE MECHANISM FOR MOTOR VEHICLES
Filed Nov. 24, 1959  2 Sheets-Sheet 1
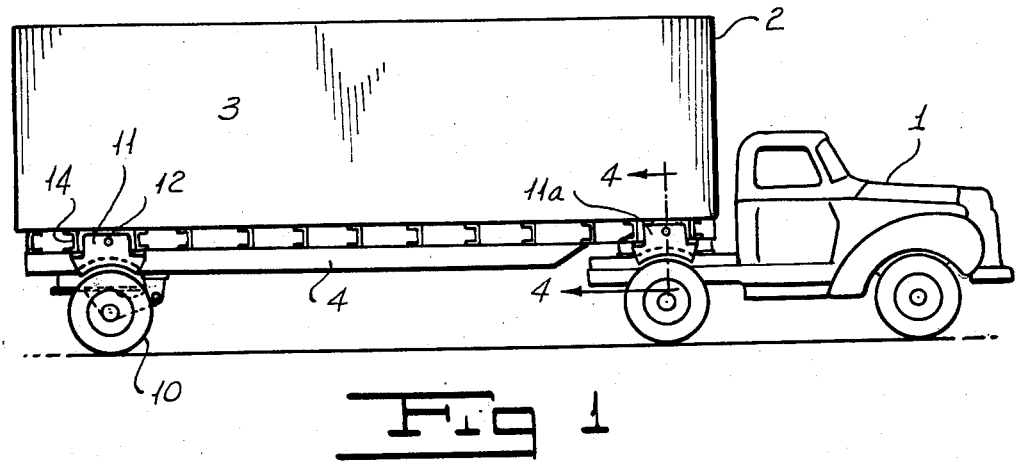
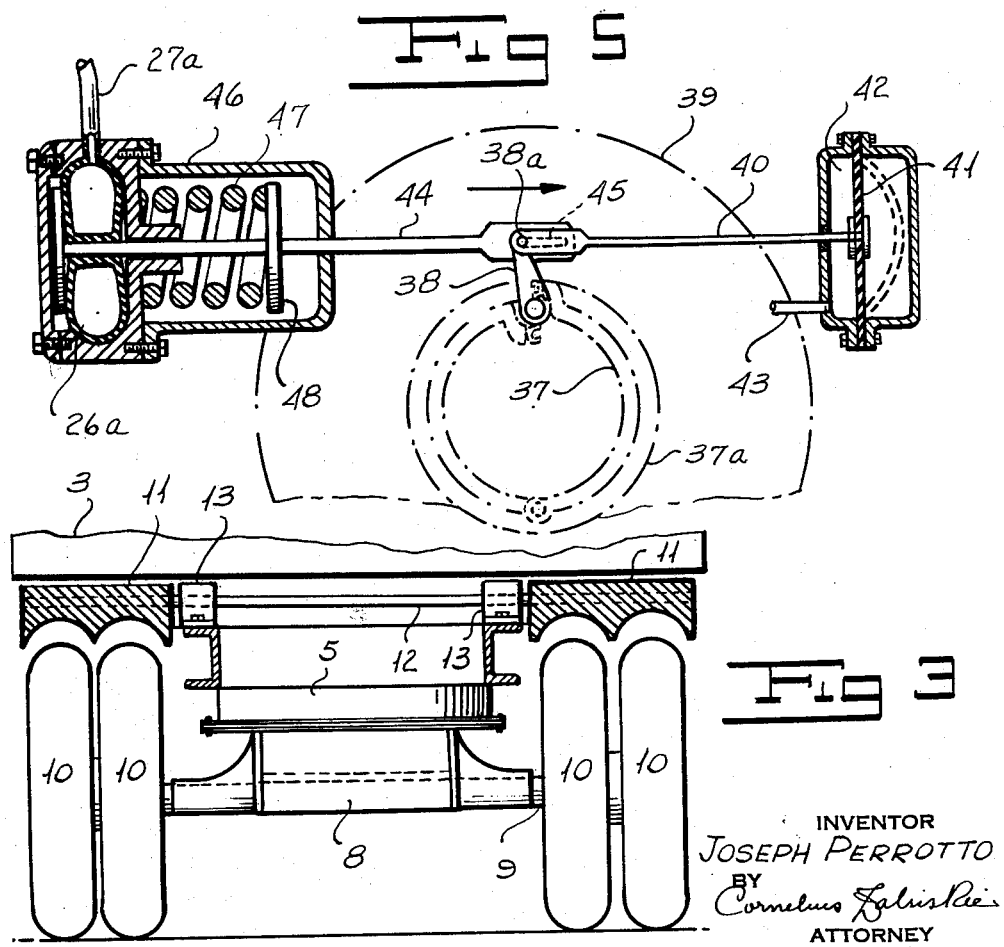
INVENTOR
JOSEPH PERROTTO
BY
Cornelius Falins Rae
ATTORNEY

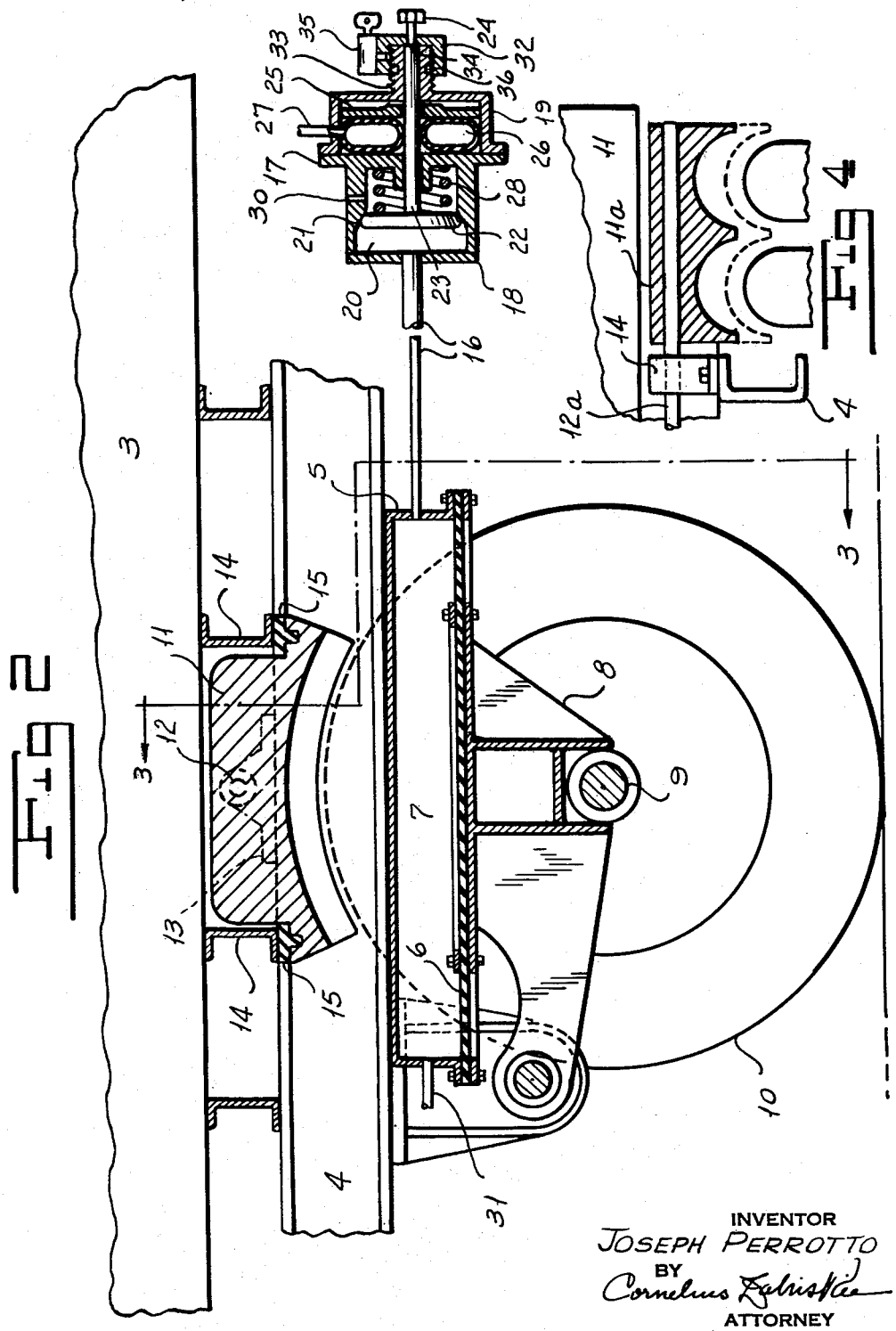

United States Patent Office 3,114,440
Patented Dec. 17, 1963

3,114,440
AUXILIARY SAFETY BRAKE MECHANISM
FOR MOTOR VEHICLES
Joseph Perrotto, Elizabeth, N.J., assignor to International Air-Springs, Inc., Elizabeth, N.J., a corporation of New Jersey
Filed Nov. 24, 1959, Ser. No. 855,217
4 Claims. (Cl. 188—152)

This invention is an auxiliary safety brake mechanism for motor vehicles of the pneumatic suspension type provided with compressed air operated brakes.

In a vehicle equipped with an air brake system, the compressed air required to operate the brakes thereof is generally contained within a pressure tank which supplies such air to the brake cylinder or cylinders, under the required pressure, as and when needed, through a valve controlled by the driver. Brakes of this character generally function satisfactorily to slow or stop the vehicle when there is adequate air pressure in the system. However, if there is any appreciable drop of pressure in the system, due to leakage, breakage of piping connection or for other reasons, the vehicle is left without adequate braking means and becomes a very dangerous mechanism, particularly when in motion.

While this is true of all vehicles equipped with air brakes, the present invention is primarily directed to overcoming this hazard in that type of vehicle wherein the body and its load are supported above the axles by interposed pneumatic suspension means, usually in the form of pneumatic cushions or chambers. These chambers are usually supplied with air under the necessary pressure, through valved connections, with a compressed air tank on the vehicle and this tank may be, though not necessarily is, the same tank as supplies air to the braking system.

The object of this invention is to provide auxiliary means for automatically mechanically braking a vehicle of the type stated, in the event that the air brake system becomes ineffective.

In the preferred form of this invention, one or more brake shoes are mounted on the chassis frame of the vehicle above the tires but spaced therefrom so long as the associated pneumatic suspension chamber is fully inflated. Each such chamber has a bleeder outlet provided with a valve mechanism which normally seals said chamber but is controlled by the pressure in the air brake system. If the pressure in that system falls below that effective to properly brake the vehicle, the valve mechanism responds, to promptly bleed sufficient pneumatic pressure from the suspension chamber to lower the brake shoes into contact with the subjacent vehicle tires. The weight of the chassis frame and its load will thus be applied directly to the wheels to provide effective braking performance and stop the vehicle.

This invention also utilizes a modified cooperative action between brake shoes mounted on a trailer, and the rear wheels of an associated tractor, to protect a tractor-trailer combination against "jack-knifing," as hereinafter more fully explained.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

FIG. 1 is a side elevation of a tractor-trailer combination embodying the present invention.

FIG. 2 is a fragmental view of the rear portion of the trailer showing certain parts thereof in vertical section so as to more clearly illustrate the present invention.

FIG. 3 is a section on the line 3—3 of FIG. 2.

FIG. 4 is a fragmental section on the line 4—4 of FIG. 1.

FIG. 5 shows a modified form of the invention.

The present invention is useful either in self-propelled vehicles, such as trucks and the like, as well as in trailer-tractor combinations. However, for the purpose of illustration, I have shown the same in the latter environment, so as to more completely illustrate this invention.

Referring to FIGS. 1-4 of the drawings, 1 designate a tractor and 2 a trailer, connected to the tractor through the usual and conventional fifth wheel construction which forms no part of the present invention. The trailer has the usual body 3 mounted on an underlying chassis frame 4. Beneath and secured to the rear portion of that frame, is a pneumatic suspension casing 5, the under side of which is closed by a flexible diaphragm 6 to form within the casing the pneumatic suspension chamber 7.

Secured to the under side of the diaphragm is an appropriate carriage 8 to which the rear axle 9 is secured. The connections between the rear axle and the diaphragm are not necessarily limited to the particular structure shown, the only criteria being that the rear axle is secured to the diaphragm and through pneumatic pressure in the chamber 7 serves to support the rear portion of the chassis frame and its load above the axle 9. On the axle 9 are mounted the usual wheels 10, shown in the drawings as embodying two coaxial wheels 10 at each end of the axle, see FIG. 3.

Mounted on a chassis frame 4, directly above each pair of wheels, is a brake shoe 11. The particular type of mounting is secondary so long as these brake shoes are supported on the frame 4 directly above the wheels in a position to be normally free from contact with the tires. However, as shown in the drawings, the brake shoes are supported on a transverse rod 12 carried by brackets 13. Each of the shoes is laterally extended to underlie adjacent transverse members 14 of the frame and blocks of rubber 15 are interposed between the opposite ends of the shoes and these members to cushion the shoes against pivotal movement and permit them to conform to the tires of the underlying wheels, when brought into contact therewith.

Under normal conditions with adequate air pressure in the chamber 7 to properly support the trailer frame 4 and its load, the brake shoes 11 will be spaced sufficiently above the tires that they will not contact the same under all conditions of loading. However, if the pressure within the pneumatic chamber 7 is lowered, as by venting this chamber as hereinafter described, the chassis frame and the brake shoes carried thereby will be lowered into contact with the tires, and will serve to mechanically brake the vehicle. This venting of the pneumatic suspension chamber is carried out in a manner next to be described, but it may be here noted that such venting and consequent braking will automatically occur according to this invention if the air brake system of the vehicle ceases to function when operated to brake the vehicle.

As shown best in FIG. 2, a pipe 16 leads from the interior of the pneumatic chamber 7 to a casing 17 rigidly mounted on the chassis frame and formed of two sections 18 and 19. Within the section 18 is a chamber 20 having therein a valve seat 21. A valve 22 is adapted to cooperate with said seat and has a valve stem 23 which extends rearwardly through the section 19 with a nut 24 on its outer end. Locked to the valve stem within the section 19 is a plate 25 and within the space between the plate 25 and the back wall of the chamber of the section 18 is a flexible annulus 26, the interior of which is connected through a pipe 27 to the pressure tank or some other part of the conventional air brake system of the vehicle so that this pipe really forms a part of said air brake system. A spring 28 is housed within the section 18 back of the valve 22.

As long as the air pressure in the air brake system is adequate to properly brake the vehicle that pressure will be communicated to the flexible annulus 26 and will inflate the latter to overcome the power of the relatively light spring 28 and thus force the valve 22 to its seat. As long as this valve is seated, it will prevent release of pressure from the pneumatic suspension chamber 7 through a pipe 16 which connects the interior of said chamber 7 with the interior of the chamber 20 in advance of the valve 22. However, in the event that the pressure in the air brake systems falls below that necessary to effectually operate the air brakes, then the pressure of the spring 28 will be sufficient to collapse the flexible annulus 26 sufficiently to permit unseating of the valve 22.

When this occurs, pressure in the pneumatic suspension chamber 7 will be released through the pipe 29, chamber 20, and about the valve 22, to exit to the atmosphere through a vent 30 back of the valve. The chassis frame will then no longer be adequately supported in spaced relation above the axle and consequently will descend sufficiently to engage the brake shoes 11 with the tires of the vehicle and effectually brake the vehicle. If the vehicle is moving at the time, it will be promptly brought to a stop. If it is not moving at the time, it will be definitely braked against movement until sufficient pressure is re-established in the cushion 26 to reseat the valve to seal the chamber 7. It will then be necessary for the further operation of the vehicle, to admit sufficient compressed air to the pneumatic suspension chamber 7, through a pipe 31, from the compressed air tank on the vehicle until the chassis frame and its load are again supported with the brake shoes 11 spaced above the tires as shown in FIG. 2.

There may be times when it is desired to leave the vehicle in a condition wherein it cannot be operated, e.g., if the vehicle is to be left in a garage without danger of it being surreptiously used. In order to guard against such use, there is fixed to the rear end of the shaft 23 a cap 32 in threaded engagement with the threaded boss 33 at the rear end of the section 19. Ordinarily the cap 32 is backed off sufficiently to permit the auxiliary braking operations hereinbefore described. However, when it is desired to protect the vehicle against movement, the cap 32 may be screwed forwardly onto the boss 33, acting against a shoulder 34, to force the valve 22 from its seat. A key operated lock 35 mounted on the cap 32 may then be actuated to enter the bolt of the lock into an annular groove 36 in the boss, so that, when the key is removed, the valve 22 is locked open. It will thus be impossible to move the vehicle until the cap is unlocked and retracted into the position shown in FIG. 2. The pneumatic suspension chamber 7 may then be re-inflated to the pressure necessary for the normal operation of the vehicle.

The fixed mounting of brake shoes on a vehicle with pneumatic suspension to directly engage the tires of the vehicle may be also employed at the connection between the tractor and the trailer which is provided with a pneumatic suspension. In FIG. 4 the brake shoe 11a at one side of the vehicle is mounted upon the forward end of the trailer directly over the corresponding wheels on a supporting rod 12a. Under these conditions the structure shown in FIG. 4 will operate the same as hereinbefore described, if connected into the brake system of the tractor. If a common compression tank supplies both tractor and trailer the pneumatic suspension chamber of the tractor will be vented simultaneously with the venting of the corresponding chamber of the trailer as will be manifest from the foregoing description. If the tractor and trailer have independent braking systems and individual pressure tanks, they will operate independently.

Under usual driving conditions, the spacing between the brake shoes and the tires will be as shown in full lines in FIG. 4, this spacing being such that, in the event of failure of the air brake mechanism of the tractor, the brake shoes will be brought into direct contact with the tires as hereinbefore described. However, there are times when weather conditions are bad or when driving over hilly terrain, that there is a tendency of a tractor-trailer combination to jack-knife. When such conditions exist, the shoes 11a may be used for an additional purpose.

For example, it is common practice in vehicles with pneumatic suspension for the pressure in the pneumatic suspension chamber to be normally controllable from the driver's seat of the vehicle. This usually is accomplished by providing at the driver's seat one or more push buttons whereby the amount of pressure fed from the pressure tank on the vehicle which supplies air pressure to both the brakes and the suspension chamber may be fed to such chamber or may be vented from the latter, according to the wishes of the driver. Since these systems are well known, it is not considered necessary to show them in the drawings. Suffice it to say that under road and weather conditions such as referred to, the driver may at his option allow some of the pressure in the suspension chamber of the tractor to be released so as to lower the brake shoes 11a sufficiently to permit lateral portions of these shoes to overlap lateral portions of the tires, as shown in dotted lines in FIG. 4. When thus positioned, an attempted jack-knifing of the trailer will cause the brake shoes 11a to engage the lateral edges of the tire, due to excessive angular change between them, and thus arrest the tendency of the trailer to go into a full jack-knife. "Jack-knifing" is a term used to describe a situation where the rear end of a trailer swings laterally out of line at a speed greater than the speed of the tractor and tends to swing the trailer transversely of the rod.

FIG. 5 of the drawings illustrates a modified control device for setting the brakes of a vehicle in the event that the ordinary air brake system ceases to function. In this figure, 37 designates an expandable brake, and 38 a lever which normally sets said brake with respect to the brake drum 37a of the wheel 39. This combination is conventional and is that generally employed in vehicles now in use.

To the lever 38 is attached a rod 40 which leads to a diaphragm 41 positioned within a casing having a chamber 42 on the near side of the diaphragm. A pipe 43 forming part of the air brake system leads to this chamber from the brake pedal and includes a valve for introducing air under pressure into chamber 42 when the brake pedal is pressed to brake the vehicle. Thus, when the brake pedal is pressed to set the brakes on the vehicle, air is admitted to the chamber 42 and the diaphragm is bulged thereby to exert a pull on the rod 40 and set one of the brakes in the usual way, this system being duplicated for each wheel. However, if the air brake system of the vehicles does not contain air under sufficient pressure to effect proper braking, then the mechanism shown at the left of this figure functions to set the brakes. This mechanism comprises a push rod 44 having in its end a slot 45 embracing the operating pin 38a on the lever 38 and long enough to permit the rod 40 to function with the pin operating idly in the slot so long as the air brakes are functioning properly. The rod 44 extends into a casing 46 having therein two chambers. In one chamber is positioned a flexible annulus 26a connected through a pipe 27a to the air brake system.

The annulus 26a is firmly secured to a push rod 44 and, as long as the pressure in the air brake system is sufficient to properly brake the vehicle, the rod 44 will be held in the position shown in FIG. 5, wherein the pin 38a of the lever 38 is at the left hand end of the slot 45. However, if the pressure in the air brake system fails, then a spring 47 will act against a fixed collar 48 on the rod 44 to force this push rod to the right in FIG. 5 and set the brake 37.

Through the employment of the auxiliary brake mechanism of this invention in all of its forms hereinbefore described, the vehicle is effectually protected by safety mechanism which automatically functions in the event of conventional air brake failure, without in any way whatsoever changing or otherwise modifying conventional air brake constructions.

The foregoing detailed description sets forth the invention in its preferred practical forms, but the invention is to be understood as fully commensurate with the appended claims.

Having thus fully described the invention, what I claim as new and desire to secure by Letters Patent is:

1. In a vehicle having a pneumatic suspension chamber interposed between an axle and the chassis frame of the vehicle and an air brake system for normally braking the vehicle, an auxiliary safety brake mechanism which comprises: brake shoes mounted on a chassis frame of the vehicle directly above the tires of the vehicle and spaced therefrom while the pressure in the pneumatic suspension chamber is sufficient to support the frame and its load above the axle, and differential pressure mechanism interconnected with the air brake system and the pneumatic suspension chamber for venting said chamber to lower the brake shoes onto the tires when the pressure in the air brake system falls below that necessary to properly apply the brakes to the vehicle.

2. A vehicle according to claim 1, wherein the differential pressure mechanism includes a vent valve for the pneumatic suspension chamber, pneumatic means connected to the air brake system for normally seating said valve while the pressure in the air brake system is sufficient to properly brake the vehicle, and means for unseating said valve to vent the pneumatic suspension chamber when the pressure in the air brake system falls below operative pressures.

3. A vehicle according to claim 2, wherein the means for unseating said valve comprises a spring.

4. A vehicle according to claim 2, wherein the pneumatic means comprises a collapsible, inflatable member communicating with the air brake system and bearing against a plate on the valve stem to hold the valve in seated condition while the pressure in the air brake system and in said inflatable member is sufficient to brake the vehicle.

References Cited in the file of this patent

UNITED STATES PATENTS

| | | |
|---|---|---|
| 1,792,895 | Cowlishaw | Feb. 17, 1931 |
| 2,056,223 | Stout et al. | Oct. 6, 1936 |
| 2,211,890 | Farmer | Aug. 20, 1940 |
| 2,231,294 | Queen | Feb. 11, 1941 |
| 2,670,063 | Reynolds | Feb. 23, 1954 |
| 2,680,500 | Jenkins | June 8, 1954 |
| 2,893,520 | Rockwell | July 7, 1959 |
| 2,909,244 | Kraft | Oct. 20, 1959 |